Feb. 2, 1932.  R. A. COFFMAN  1,843,206
PROPELLER HUB AND LOCK
Filed June 18, 1928  4 Sheets-Sheet 1
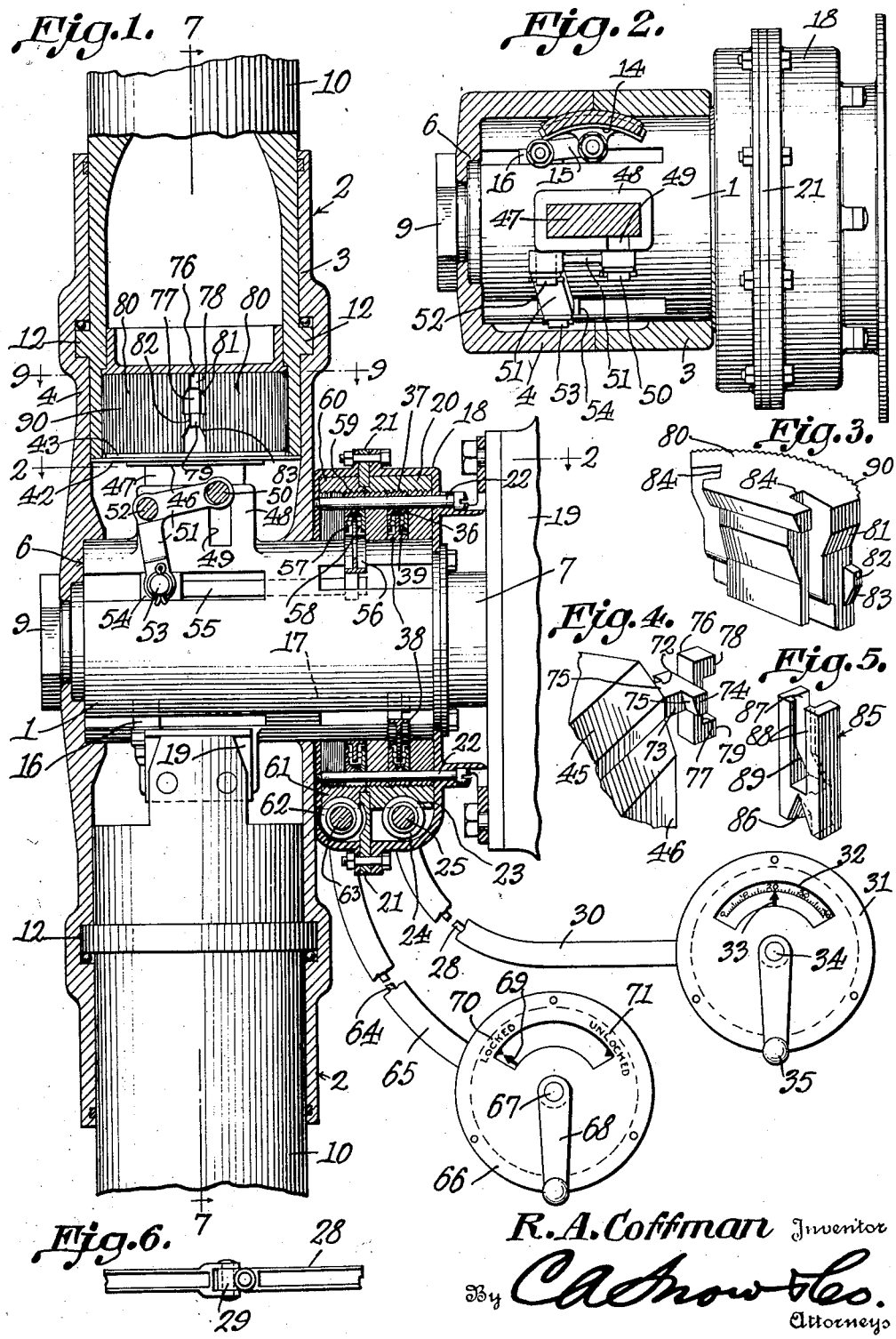

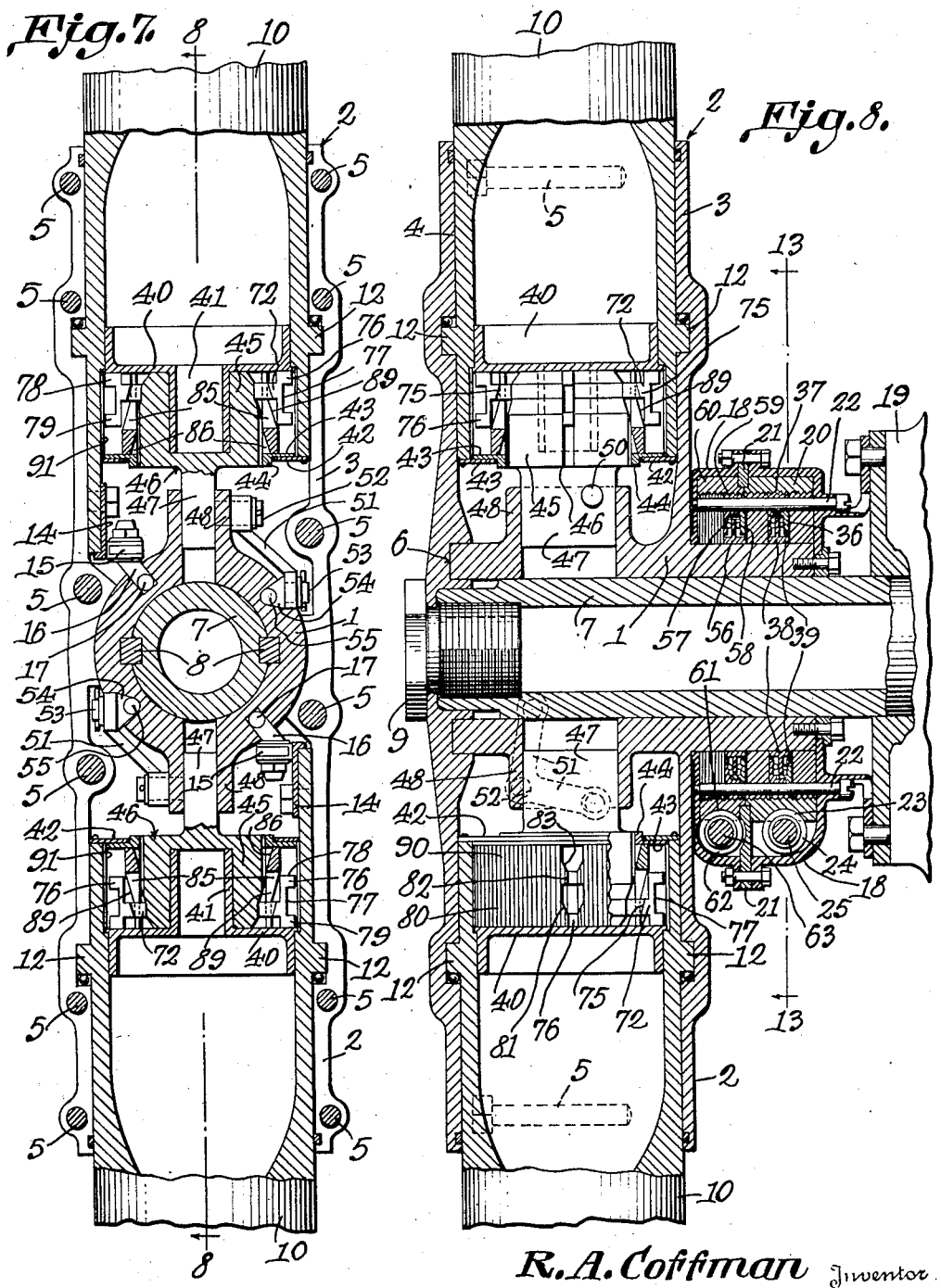

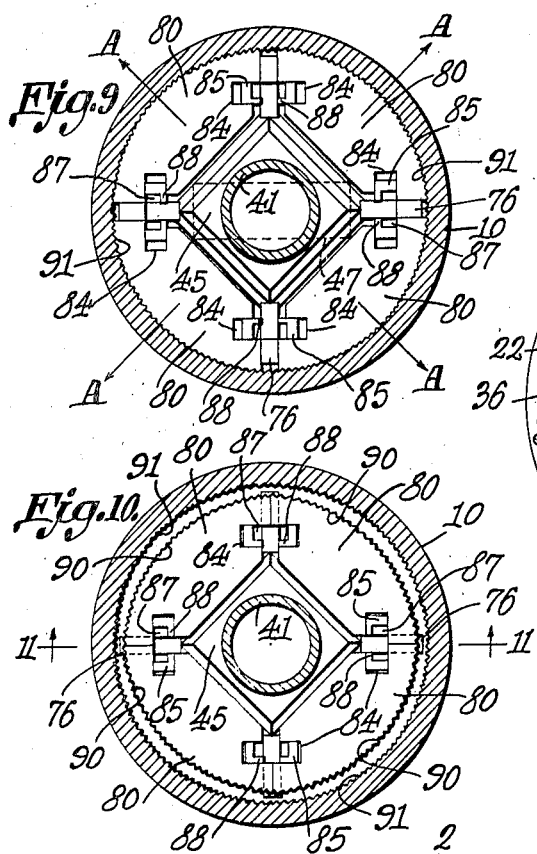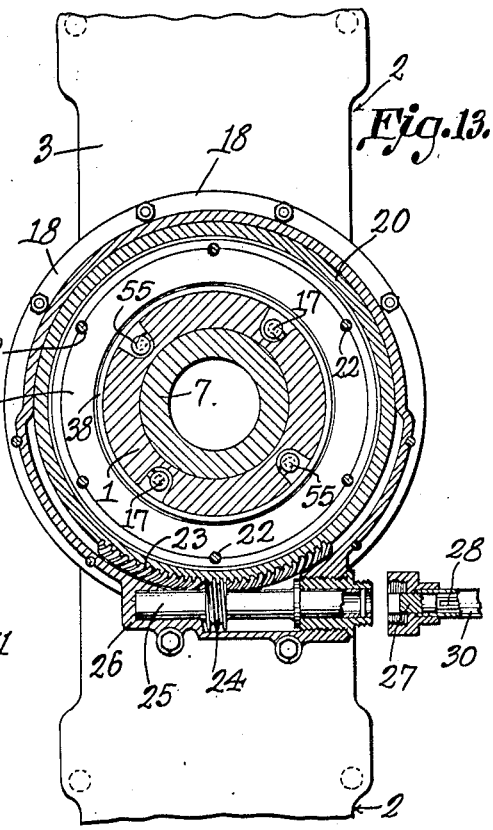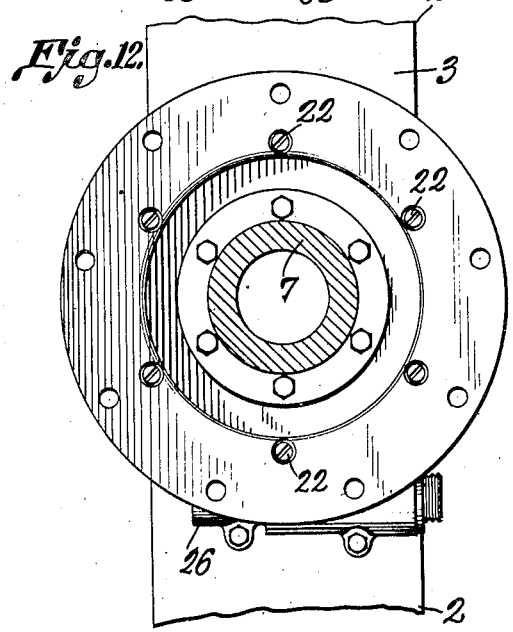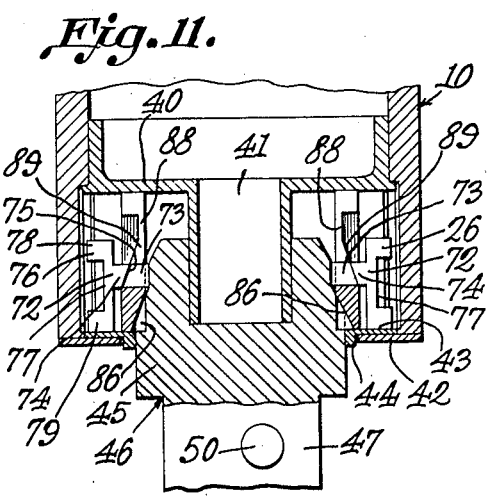

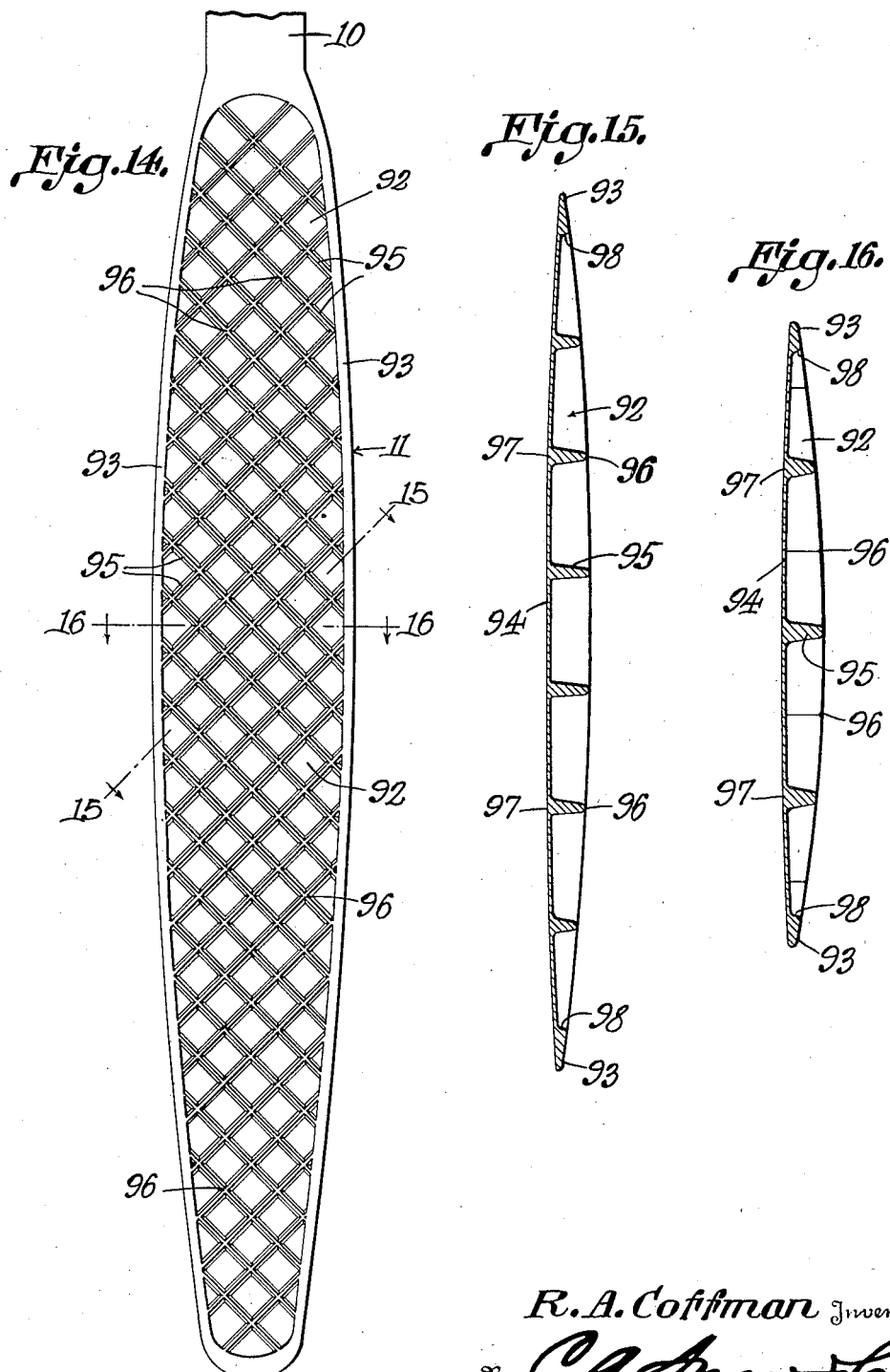

Patented Feb. 2, 1932

1,843,206

UNITED STATES PATENT OFFICE

ROSCOE A. COFFMAN, OF HOLLYWOOD, CALIFORNIA

PROPELLER HUB AND LOCK

Application filed June 18, 1928. Serial No. 286,328.

This invention aims to provide novel means for adjusting the blades of an airplane propeller, each blade being angularly adjusted around its own longitudinal axis, thereby to change the pitch of the blade. Another object of the invention is to provide novel means for locking the propeller blades positively and securely after they have been turned to change the pitch. Another object of the invention is to provide novel means whereby the pitch of the propeller blades, and the locking means therefor, may both be controlled from the instrument board, at the will of an operator. The invention aims to provide a locking device which will hold the blades against fluttering. A further object of the invention is to provide a novel means whereby the parts which work to change the pitch of the blades, and the parts which actuate the locking means, will be housed in and protected.

It is within the province of the disclosure to improve generally the rigidity and structural strength of mechanism for adjusting the pitch of propeller blades.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in section, a device constructed in accordance with the invention, parts being in elevation;

Figure 2 is a transverse section on the line 2—2 of Figure 1;

Figures 3, 4, and 5, are detail perspective views showing parts of the mechanism for locking the blades after the blades have been shifted to vary their pitch;

Figure 6 is a fragmental elevation showing a part of the flexible shaft;

Figure 7 is a section on the line 7—7 of Figure 1;

Figure 8 is a section on the line 8—8 of Figure 7;

Figure 9 is a transverse section on the line 9—9 of Figure 1, the parts being in locked position;

Figure 10 is a sectional view similar to Figure 9 but showing the parts as they will appear when unlocked;

Figure 11 is a section on the line 11—11 of Figure 10;

Figure 12 is a rear elevation showing part of the casing and associated parts;

Figure 13 is a section on the line 13—13 of Figure 8;

Figure 14 is a plan showing a portion of the blade of the propeller; and

Figures 15 and 16 are sections taken, respectively, on the lines 15—15 and 16—16 of Figure 14.

The body in which the moving parts of the device are housed and on which they are carried, includes a tubular hub 1, shown in side elevation, in Figure 1, in transverse section in Figure 7, and in longitudinal section in Figure 8. Oppositely disposed radial tubular bearings 2 preferably are formed integrally with the hub 1, as Figure 8 will show, and a front member 4 is made as a separate piece which is extended across the forward end of the hub 1, as seen in Figure 8. The parts 3 and 4 of the radial bearings 2 are held together by securing elements 5, to be seen in Figure 7. The front member 4 in its central portion is provided with a socket 6 for the forward end of the hub 1, and the forward end of a hollow driven shaft 7 is likewise socketed in the part 4. The shaft 7 is received within the tubular hub 1. The shaft 7 is keyed at 8 to the hub 1 as disclosed in Figure 7, and the forward end of the shaft 7 is connected by a securing device 9 to the central part of the member 4.

The parts 2 are called bearings, because the arms 10 of the propeller blades 11 are mounted in them for rotation, at the will of an operator, thereby to change the pitch of the blades 11. As shown at 12, the arms 10 of the propeller blades 11 are antifrictionally held against longitudinal movement in the bearings 2.

As to the means whereby the propeller blades are turned about an axis, to change their pitch, it will be observed that, as shown in Figures 7 and 2, brackets 14 are secured within the arms 10 of the propeller blades 11, at the inner ends of the arms. Links 15 are pivoted to the brackets 14 and to extensions 16 on connections 17, in the form of rods, the connections 17 being mounted to slide in the hub 1, longitudinally of the hub.

A casing 18 is secured to any accessible part 19 of the engine frame of the airplane. A bearing ring 21 is held between the constituent parts of the casing 18. An annular member 20 is mounted for rotary adjustment between the bearing ring 21 and the rear wall of the casing 18. The casing 18 and the annular member 20 are disposed about the rear portion of the hub 1, as seen in Figure 8. Any suitable means may be provided for imparting rotation to the annular member 20 at the will of an operator. As shown, but not of necessity, the annular member 20 has a worm gear segment 23 (Figure 13) cooperating with a worm 24 on a shaft 25 journaled for rotation in a bearing 26 on the lower part of the casing 18.

The outer end of the shaft 25 is securely but separably connected, as at 27, with a flexible shaft 28 (Figures 6 and 1), the shaft 28 including any desired number of universal joints 29. The shaft 28 operates within a tubular covering 30 extended to the casing 31 of an indicator mounted on the instrument board of the airplane, within easy reach of the operator. The indicator includes a dial 32 preferably graduated to single degrees and adapted to cooperate with a hand 33 on the dial shaft 34. The dial shaft 34 is operated by a handle 35 which the driver of the plane can reach readily.

A slide 36, in the form of an internally grooved ring, is mounted to reciprocate for adjustment on guide rods 22 mounted in the casing 18 and arranged parallel to the axis of the hub 1. The annular member 20 is provided with internal threads 37 cooperating with corresponding external threads on the slide 36. An annular track 38 is disposed about the hub 1, and the rear ends of the connections or rods 17 are joined to the track 38. The track 38, therefore, rotates with the hub 1, but the track extends into the groove in the slide 36 and is antifrictionally supported therein by balls 39 or the like, shown in Figures 8 and 1.

A partition 40 is secured in each of the arms 10 and has an inwardly projecting hollow guide stem 41. A retainer 42, in the form of a ring, is secured to the inner end of the arm 10. The retainer 42 is overlapped by another ring 43, which has a thickened collar 44, wherein slides the head 45 of an actuating member 46, the head 45 of the actuating member being mounted to slide on the guide stem 41 of the partition 40, longitudinally of the stem. The actuating member 46 includes a reduced shank 47, which, as shown in Figure 2, is of rectangular oblong cross section. The head 45 preferably is square in cross section, as Figures 9 and 10 will show.

The shank 47 of the actuating member 46 is mounted to slide in a guide 48 on the hub 1, there being two of the guides 48, in the present embodiment of the invention, because there are two propeller blades, and the parts provided for the actuation of the member 46 being duplicated: this being understood, the description will proceed in the singular number. The guide 48 has longitudinal slot 49 in which moves a pivot element 50, mounted in the shank 47 of the actuating member 46. A bell crank lever 51 is fulcrumed at 52 on the guide 48, one arm of the bell crank lever being connected to the pivot element 50. The other arm of the bell crank lever 51 is carried by a pivot element 53 on the extension 54 of a connection or rod 55 which is slidably mounted in the hub 1 for movement longitudinally of the hub.

The connection 55 is secured to a track 56, constructed like the track 38, and mounted to slide on the hub 1, lengthwise of the hub. The track 56 rotates with the hub 1. The track 56 is journaled in a slide 57, corresponding to the slide 36. The slide 57 is held for right line sliding movement on the guide rods 22. That part of the track 56 which extends into the slide 57 is carried on ball bearings 58, located within the slide. The slide 57 has external threads 59, cooperating with internal threads on an annular member 60 mounted to turn for adjustment in the casing 18, between one end of the casing and the bearing ring 21.

Any suitable means may be provided for rotating the annular member 60. If desired, the annular member 60 may be supplied with a worm gear segment 61, corresponding to the gear segment 23 of Figure 13, the gear segment 61 cooperating with a worm 62 on a shaft 63, mounted like the shaft 25 of Figure 13. The shaft 63 is connected to the casing 66 of an indicator mounted on the instrument board of the airplane, within easy reach of the driver of the plane. The shaft 64 is operated by the shaft 67 of the indicator, and the shaft 67 of the indicator carries an operating handle 68, of any desired construction. The shaft 67 of the indicator has a hand 69 coacting with suitable marks 70 and 71 on the dial of the indicator.

The mark 70 may be the word "Locked", and the mark 71 may be the word "Unlocked".

Referring especially to Figure 4, the head 45 of the actuating member 46 has outstanding T-shaped projections 72, each projection including a body 73 and a transverse head 74 at the outer end of the body. The inner surfaces of the head 74 are bevelled, as shown at 75. An expander 76 is disposed transversely of the head 74 and is rigidly mounted on the outer surface of the head. The expander 76 includes an intermediate portion 77 and outstanding fingers 78 and 79.

Locking jaws 80 are arranged around the head 45 of the actuating member 46. The jaws 80 are received slidably between the partition 40 and the ring 43, the construction being such that the jaws can slide inwardly and outwardly, radially, with respect to the axis of the guide stem 11 (compare Figures 7, 9 and 10). The jaws 80 are supplied on their edges with cam surfaces 81. There are lugs 82 on the edges of the jaws 80, and the lugs 82 have cam surfaces 83. The jaws 80 are supplied with longitudinal inwardly extended recesses or slots 84. Connectors 85, in the form of blocks, are provided. The connectors 85 have no endwise movement in a direction parallel to the axis of the guide stem 41.

The connectors 85 are called by that name because they are received in the slots or recesses 84 of the jaws 80 and connect the jaws, the construction, however, being such that the jaws may be expanded outwardly into the position of Figure 10 or be contracted into the position of Figure 9. In their inner ends, the connectors have recesses 86 which give clearance for the corners of the rectangular head 45 of the actuating member 46. On their outer sides, the connectors 86 have slots 87, and at the back of the slots 87 there are longitudinal flanges 88, spaced apart, there being outwardly slanting cam surfaces 89 on the connectors 85, at the lower ends of the flanges 88, as Figure 5 of the drawings will show. The part 77 of the expander 76 is disposed between the flanges 88 of the connectors 85, the head 74 moving in the slot 87, and the cam surfaces 75 on the head 74 being adapted to cooperate with the cam surfaces 89 on the connector 85. The expander 76 works between the ends of adjoining jaws 80, the finger 78 of the expander 76 being adapted to cooperate with the cam surface 81 on the jaws 80. The fingers 79 of the expander 76 are adapted to cooperate with the cam surfaces 83 of the lugs 82 on the jaws 80. The jaws 80 are supplied with external teeth or ribs 90, adapted to cooperate with correspondingly shaped teeth or ribs 91 on the inner surface of the propeller arms 10.

So far as shifting the blades to change their pitch is concerned, it will be understood that the operator can rotate the indicator shaft 34 by means of the handle 35. When the shaft 34 is rotated, the hand 33 cooperates with the dial 32 and the operator can, in this way, obtain a fine adjustment, namely, a degree at a time. When rotation is imparted to the shaft 34 of the indicator, the flexible shaft 28 is rotated, and rotation is imparted to the shaft 25 of Figure 13. The worm 24 on the shaft 25, cooperating with the pinion 23 on the annular member 20, rotates the annular member 20. When the annular member 20 is rotated, right line sliding movement is imparted to the slide 36 on the guides 22, because the annular member 20 and the slide 36 have a threaded connection, as shown at 37. When the slide 36 is caused to move lengthwise of the guides 22, as aforesaid, the connections or rods 17 (Figures 1 and 7) operate the links 15 of Figure 2, and, by way of the brackets 14 on the arms 10 of the propeller blades 11, the arms of the propeller blades are caused to turn around their axes, thereby changing the pitch of the propeller blades 11. It is to be noted that the connections or rods 17 and other parts of the device, are housed and covered so that they will not be likely to be damaged by external objects. The operator can change the pitch of the blades by a simple operation which consists in turning the handle 35 of Figure 1.

As to the operation of the locking device, the operator rotates the indicator shaft 67 (Figure 1) by means of the handle 68. Generally stated, about ten turns of the shaft 67 are necessary to move the hand 69 between the marks 70 and 71. The shaft 67 rotates the shaft 64, and the shaft 64 rotates the shaft 63. The shaft 63 rotates the worm 62, and the worm, cooperating with the pinion 61, rotates the annular member 60. When the member 60 is rotated, the threads 59 cause the slide 57 to move lengthwise of the guide rods 22. The track 56 is moved lengthwise of the hub 1. The track 56 imparts longitudinal sliding movement to the connections or rods 55, and the rods 55 tilt the bell cranks 50 on their fulcra 52. The bell cranks 51 slide the actuating members 46 in or out, longitudinally of the propeller arms 10.

When the actuating members 46 are moved outwardly, the fingers 78 ride along the cam surfaces 81 of the jaws 80, and the fingers 79 ride along the cam surfaces 83 of the jaws and the jaws are expanded in the direction of the arrows A in Figure 9 of the drawings. This causes the teeth 90 of the jaws 80 to engage with the teeth 91 of the arms 10 of the propeller. The ribs or teeth 90 are separated by a distance of one degree of arc, and the same observation holds true with respect to the teeth 91.

Noting that the blades may be changed in pitch a degree at a time, by the mechanism shown at 35—34—33 in Figure 1, it will be obvious that, by the mechanism shown at 91—90—10—80 in Figure 10, the locking device is capable of taking care of so fine an adjustment, even, as one degree of rotation. When the jaws 80 are expanded, as shown in Figure 9, a secure lock is afforded, and there will be no flutter of the propeller blades, it being a matter of common knowledge that even a micrometic flutter in the blades of a propeller soon will work much damage to the plane and affect its operation to the danger point. When the teeth 90 and 91 are interengaged, the arms 10 of the propeller cannot rotate with respect to the jaws 80. The jaws 80 cannot rotate with respect to the head 45 of the actuating member 46, because they are securely held upon the flat sides of the head 45. The actuating member 46 cannot turn on an axis, because the oblong shank 47 of the actuating member is received in the guide 48 on the hub 1. There is an advantage in making the shank 47 of the oblong cross section shown in Figure 2, because, as the shank approaches a square in cross section, the chances of shearing off the corners of the shank, under twist increases.

It has been explained how the jaws 80 are expanded into the position shown in Figure 9, and it now remains to explain how the jaws are retracted into the position of Figure 10, to disengage the teeth 90 from the teeth 91 and to permit the arms 10 of the propeller blades to be rotated, to change the pitch, by the means shown at 34—35 in Figure 1. The bell crank 51, of course, can move the actuating member 46 inwardly toward the axis of the hub 1, and when this occurs, the cam surfaces 75 on the head 74 of the projection 72 on the head 45 cooperate with the cam surfaces 89 of the connectors 80 and draw the connectors in toward the axis of the guide stem 41 in Figure 10. When the connectors 85 move inwardly as aforesaid, they carry the jaws 80 inwardly, since the connectors are mounted in the slots 84 of the jaws 80. The jaws 80, when drawn inwardly, appear as in Figure 10, the teeth 90 of the jaws being disengaged from the teeth 91 of the arms 10.

In connection with a device of the class described, it is desirable to have a light propeller blade: and as a matter of fact, a light propeller blade is always desirable. Such a blade is shown in Figures 14, 15 and 16 of the drawings. The propeller blade, designated generally by the numeral 11, has a recess 92 on its rear side, the recess 92 defining a marginal rim 93 and a shell 94. Ribs 95 are disposed at an angle to each other within the recess 92 and are formed integrally or joined otherwise, at the places 96 where they cross. The ribs 95, moreover, are connected at 97 with the shell 94, and are connected as shown at 98, at their ends, with the rim 93. The blade 11 may be of any desired configuration, and owing to the fact that it has the recess 92, it will be very light. Although the blade is light, it will be possessed of the requisite strength, because it is reinforced by the ribs 95.

The ribs 95 are at an angle to each other and are at an angle to both the length and the width of the blade. The blade, therefore, not only is reinforced against transverse flexure and longitudinal flexure, but, as well, is reinforced against strains arising out of torque or twist.

Having thus described the invention, what is claimed is:—

1. In a device of the class described, a body supported for rotation and including a hub, a blade mounted to rock in the body, thereby to change the pitch of the blade, and mechanism connected to the blade for rocking the same, comprising an element housed within the hub and held therein for straight line reciprocation longitudinally of the axis of the hub and rotatable therewith, a collar mounted to reciprocate on the hub and connected to said element, and means under the control of an operator for actuating the collar, independently of the rotation of the body, to reciprocate said element.

2. In a device of the class described, a body supported for rotation and including a hub, a blade mounted to rock in the body, thereby to change the pitch of the blade, a threaded slide, means for mounting the slide for movement longitudinally of the hub, an annular member into which the slide is threaded, a track movable longitudinally of the hub and whereon the slide is rotatable, means for connecting the track with the blade to rock the blade as aforesaid, and means under the control of an operator for rotating the annular member.

3. In a device of the class described, a body supported for rotation and including a hub, a blade mounted to rock in the body to change the pitch of the blade, a threaded slide, means for mounting the slide for movement longitudinally of the hub, an annular member into which the slide is threaded, means for connecting the slide with the blade to rock the blade as aforesaid, and mechanism actuable independently of rotation of the hub for rotating the annular member, the said mechanism comprising an indicator so arranged as to be visible to the operator of the said mechanism.

4. In a device of the class described, a body supported for rotation and including a hub, a blade mounted to rock in the body to change the pitch of the blade, a connection mounted in the hub for sliding movement lengthwise of the hub, a link pivoted to the connection, means for pivotally connecting the link to the blade, a collar for moving the connection lengthwise of the hub and means under the control of an operator for moving the collar lengthwise of the hub.

5. In a device of the class described, a body supported for rotation and including a hub, a blade mounted to rock in the body thereby to change the pitch of the blade, a link, means for pivotally connecting the link to the blade, eccentrically of the blade, a connection mounted to slide lengthwise of the hub, the link being pivoted to the connection, a pair of interengaging relatively rotatable members arranged coaxially with the hub, one of said members being an actuating member for moving the connection lengthwise of the hub, and means under the control of an operator for moving the other member lengthwise of the hub.

6. In a device of the class described, a body, a propeller blade mounted to rock about an axis in the body, thereby to change the pitch of the blade, means under the control of an operator for rocking the blade as aforesaid, mechanism independent of said means for locking the blade in any position to which it may have been rocked to change the pitch, and movable mechanical means directly actuable by an operator and directly connected mechanically to said mechanism for governing and controlling it.

7. In a device of the class described, a body, a propeller blade mounted to rock about an axis in the body thereby to change the pitch of the blade, means under the control of an operator for rocking the blade as aforesaid, and mechanism independent of said means for locking the blade in any position to which it may have been rocked to change the pitch, said mechanism including a part under the control of an operator and accessible from a point widely remote from the propeller blade.

8. In a device of the class described, a body, a propeller blade mounted to rock about an axis in the body, thereby to change the pitch of the blade, means under the control of an operator for rocking the blade as aforesaid, and mechanism independent of said means for locking the blade in any position to which it may have been rocked to change the pitch, said means and said mechanism each comprising an indicator and an actuating handle, one indicator and the corresponding handle being located close enough to the other indicator and its handle so that the indicators are visible at once to an operator and the handles readily accessible at once to an operator.

9. In a device of the class described, a body, a propeller blade mounted to rock about an axis in the body thereby to change the pitch of the blade, the blade having a rack the teeth of which are spaced apart by single degrees, a jaw having teeth cooperating with the teeth of the rack, means for mounting the jaw on the body for movement into and out of engagement with the rack on the blade, and means for moving the jaw into and out of engagement with the rack on the blade.

10. In a device of the class described, a body, a propeller blade mounted to rock about an axis in the body thereby to change the pitch of the blade, means under the control of an operator for rocking the blade as aforesaid, a circumferential rack on the blade, jaws movable outwardly and inwardly into and out of engagement with the rack, an actuating member for the jaws, an operating element conveniently located for manipulation by the operator, and operative driving connections between the actuating member and the operating element.

11. In a device of the class described, a body, a propeller blade mounted to rock about an axis in the body thereby to change the pitch of the blade, means under the control of an operator for rocking the blade as aforesaid, and mechanism independent of said means for locking the blade in any position to which it may have been rocked to change the pitch, said mechanism comprising jaws outwardly movable to engage the blade, the jaws having cams, connectors slidably engaged with the jaws and having cams, an actuating member, means for mounting the actuating member movably, and means for operating the actuating member, the actuating member comprising a part which cooperates with the cams of the jaws to expand the jaws and to cause them to engage the blade, the actuating member comprising a part which cooperates with the cams of the connectors to retract the jaws with respect to the blade.

12. A device of the class described comprising a propeller blade movable to effect a variation in pitch, means for moving the propeller blade for the purpose specified, and independent mechanical means mechanically under the control of an operator for locking the blade in any position to which it may have been moved as aforesaid.

13. The combination with a propeller blade of a hub for supporting the same, the blade being mounted in the hub for angular adjustments about the longitudinal axis of the blade, and mechanism connected to the blade for angularly adjusting the same comprising relatively rotatable members having interengaging portions to prevent relative movement therebetween longitudinally of the axis of rotation, one of said members being carried by the hub for rotation therewith, and means under the control of an operator for moving the other member longitudinally of the axis of rotation independently of rotation of the hub.

14. In a propeller, a rotatable body, a blade mounted in the body for rotation about an axis substantially at right angles to the axis of rotation of the body, means for adjusting the blade about said angular axis and mechanically operated means for gripping said blade simultaneously at a plurality of oppositely disposed points about its perimeter, to hold said blade in adjusted position.

15. In a fluid pressure motor, a blade, means for adjusting and locking the blade, and a plurality of remote controls for said adjusting and locking means movable bodily with respect to each other and with respect to the motor for mounting in places remote from the motor and selected at installation.

16. In a fluid pressure motor, a blade, means for adjusting and locking the blade against adjustment, and a plurality of remote controls for said adjusting and locking means movable bodily with respect to each other and with respect to the motor for mounting in places remote from the motor and selected at installation.

In testimony that I claim the foregoing as my own, I have hereto affixed my signature.

ROSCOE A. COFFMAN.